United States Patent [19]

Miller

[11] Patent Number: 5,031,950
[45] Date of Patent: Jul. 16, 1991

[54] SUNVISOR WITH COVERING ATTACHMENT MECHANISM

[75] Inventor: Douglas C. Miller, Hersey, Mich.
[73] Assignee: Plasta Fiber Industries, Inc., Marlette, Mich.
[21] Appl. No.: 570,864
[22] Filed: Aug. 22, 1990
[51] Int. Cl.$^5$ .............................................. B60J 3/00
[52] U.S. Cl. .................................................. 296/97.1
[58] Field of Search ........................... 296/97.1, 97.6; 29/91.1

[56] References Cited

U.S. PATENT DOCUMENTS

| | | | |
|---|---|---|---|
| 3,827,748 | 8/1974 | Herr et al. | 296/97.1 |
| 4,458,938 | 7/1984 | Viertel et al. | 296/97.1 |
| 4,763,946 | 8/1988 | Robbins et al. | 296/97.1 |
| 4,867,500 | 9/1989 | Oosterbaan et al. | 296/97.1 |
| 4,890,875 | 1/1990 | Takahashi | 296/97.1 |

Primary Examiner—Robert R. Song
Attorney, Agent, or Firm—Brooks & Kushman

[57] ABSTRACT

A mechanism for attaching an outer fabric covering to a plastic shell is provided wherein inner and outer walls integrally formed on the inner periphery of a lower shell half define a channel and a locking wall integrally formed on the inner periphery of an upper shell half locks the covering in the channel when the shell is closed. The attachment mechanism secures the covering to prevent the covering from working loose during normal operation of the sunvisor. The mechanism further includes a peripheral lip integrally formed with the locking wall. The covering is secured between the peripheral lip and a free end portion of the outer wall. The lip has a curved outer surface for receiving one free edge portion of the covering thereon. The outer wall also has a curved outer surface for receiving another free edge portion of the covering thereon. The curved outer surfaces of the outer wall and the lip at least partially define a curved outer surface of the shell when closed.

8 Claims, 1 Drawing Sheet

SUNVISOR WITH COVERING ATTACHMENT MECHANISM

TECHNICAL FIELD

This invention relates to sunvisors, and in particular to sunvisors having an inner plastic shell.

BACKGROUND ART

Many visors employed in automobiles are made of a plastic, shell-type core covered by a fabric colored and textured to match the interior upholstery of the vehicle.

The edge of many prior art visors is trimmed using a trim bead, and in some cases, the trim bead is attached to the edge of the core by stitching through the plastic material itself.

Because the covering of fabrics of some plastic shell-type sunvisors tend to pull out and loosen or "bag" during or after shell closure, pre-edge folding and gluing or other methods of pre-attaching the fabric to the sunvisor shell have been used.

For example, U.S. Pat. No. 4,494,789 discloses in one embodiment the use of a snap-in ring or frame which compressibly holds upholstery fabric against the walls of the core. In another embodiment, the upholstery material is wrapped around the free edges of the clam shell core and held in place around the peripheral boundary of the visor with adhesive and by the clamping action of the visor core itself. In this construction, the visor core halves are bonded together with the upholstery and material held in place.

In U.S. Pat. No. 4,763,946, a plurality of slots on one side of the core are formed for receiving tabs projecting outwardly from a corresponding mating visor half. A plurality of outwardly projecting pins and corresponding mating recesses formed continuously around the periphery on the opposite visor core half press the edges of the upholstery material and clamp them in a secure position as the visor halves are brought together during manufacture.

One problem with such fabric attaching mechanisms is that the cost is relatively high.

SUMMARY OF THE INVENTION

An object of the present invention is to provide a relatively inexpensive attachment mechanism for securing a sunvisor covering to a plastic shell-type core in an aesthetically pleasing manner.

In carrying out the above object and other objects of the present invention in a sunvisor including an inner plastic shell having upper and lower halves and an outer fabric covering having free edge portions, an attachment mechanism is provided for securing the covering on the shell so that the covering is prevented from working loose. The mechanism includes elongated inner and outer walls integrally formed on the inner periphery of the lower shell half to define a channel therein. The mechanism also includes a mating locking wall integrally formed on the inner periphery of the upper shell half. The locking wall extends into the channel to lock the free edge portions of the covering in the channel between the locking wall and the inner and outer walls when the shell is closed.

Preferably, the mechanism further includes an outer peripheral lip integrally formed with the locking wall. Also, preferably, the outer wall includes a free end portion. The free edge portions of the covering are secured between the lip and the free end portion of the outer wall when the shell is closed.

Also, preferably, the outer wall has a curved outer surface for receiving one free edge portion of the covering thereon, and the lip has a curved outer surface for receiving another free end portion of the covering thereon. The curved outer surfaces of the outer wall and the lip at least partially define a curved outer surface of the shell when closed.

The advantages accruing to the attachment mechanism are numerous. For example, it provides a relatively inexpensive mechanism for covering a plastic shell-type core with a fabric covering in an aesthetically pleasing fashion to prevent the fabric covering from pulling out and loosening or "bagging" as the shell is closed.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
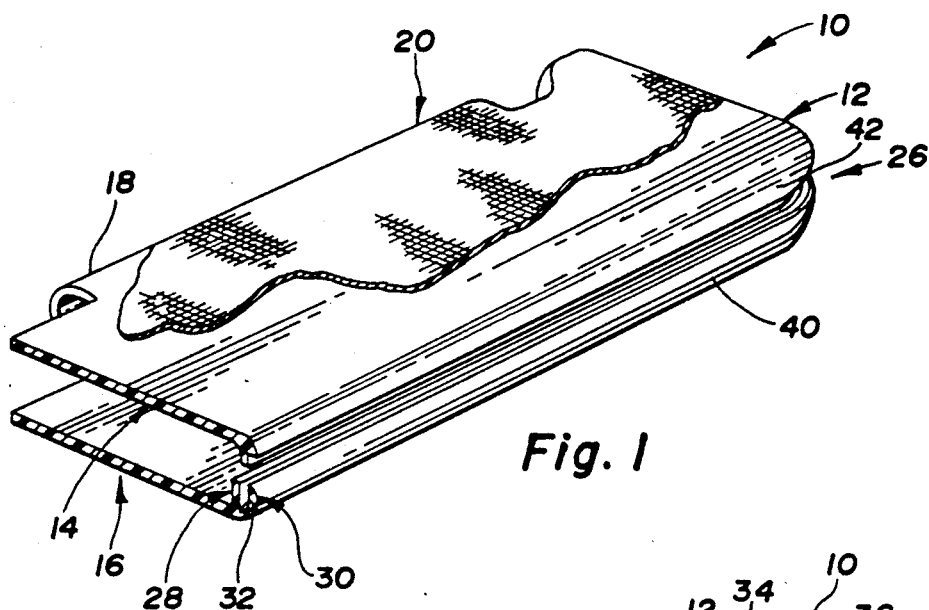
FIG. 1 is a perspective view, partially broken away and in cross section, of a vehicle sunvisor constructed in accordance with the present invention.

Referring now to the drawing figures, there is illustrated in FIG. 1 a sunvisor, generally indicated at 10, including an inner plastic shell, generally indicated at 12, having upper and lower shell halves, generally indicated at 14 and 16, respectively. The upper and lower halves 14 and 16 are integrally connected together at portion 18.

The sunvisor 10 also includes an outer fabric covering, generally indicated at 20, having free edge portions 22 and 24, respectively.

The sunvisor 10 includes a locking or attachment mechanism generally indicated at 26 to lock the fabric covering 20 in place when the plastic shell 12 is closed. The covering 20 is locked on the shell 12 so that the covering 20 is prevented from working loose during normal use of the sunvisor 10.

The attachment mechanism 26 includes elongated inner and outer walls, generally indicated at 28 and 30, respectively, which are integrally formed at an inner peripheral portion of the lower shell half 16 to define a channel 32 therebetween.

Figure 2:
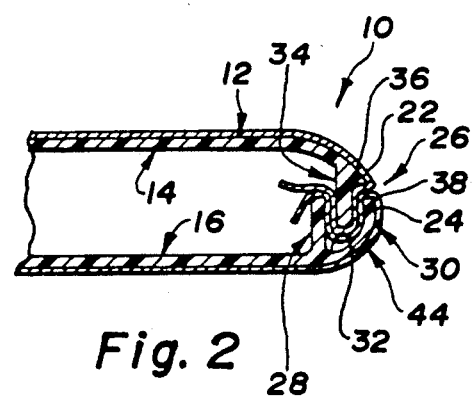
FIG. 2 is a view partially broken away and in cross section illustrating the attachment mechanism wherein free edge portions of the fabric covering are locked in the interior of a closed plastic shell.

The attachment mechanism 26 also includes a mating locking wall, generally indicated at 34, which is integrally formed at an inner peripheral portion of the upper shell half 14. The locking wall 34 extends into the channel 32 to lock the free edge portions 22 and 24, respectively, of the fabric covering 20 in the channel 32 between the locking wall 34 and the inner and outer walls 28 and 30, respectively, when the shell 12 is closed as illustrated in FIG. 2. The mechanism 26 prevents the fabric covering 20 from pulling out and/or loosening or "bagging" as the shell 12 is closed. The fabric covering 20 is pulled smooth and tight and will not pull out or work loose during normal use.

The locking mechanism 26 further includes an outer peripheral lip or lip portion 36 which is integrally formed with the locking wall 34. The lip 36 cooperates with a free end portion 38 of the outer wall 30 to secure the free edge portions 22 and 24, respectively, of the fabric covering 20 therebetween when the shell 12 is closed.

As best shown in FIGS. 1 and 2, the outer wall 30 has a curved outer surface 40 for receiving thereon one free edge portion 24 of the fabric covering 20 and the lip 36 has a curved outer surface 42 for receiving thereon the other free edge portion 22 of the covering 20. The curved outer surfaces 40 and 42 of the outer wall 30 and the lip 36, respectively, at least partially define a curved outer surface, generally indicated at 44 in FIG. 2, of the shell 12 when the shell 12 is closed.

Figure 3:
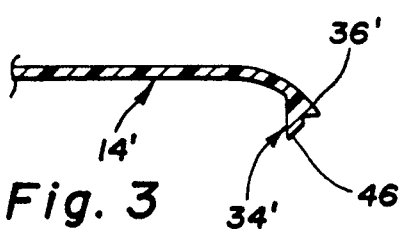
FIG. 3 is a view, partially broken away and in cross section, of a first embodiment of an upper half of the plastic shell.
Figure 4A:
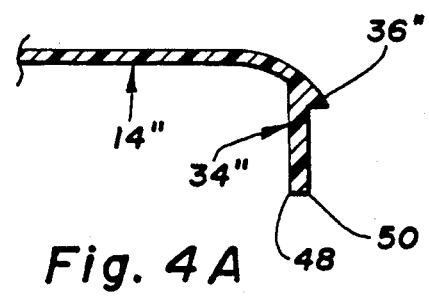
FIG. 4A is a view partially broken away and in cross section, of a second embodiment of the upper half of the plastic shell.
Figure 4B:
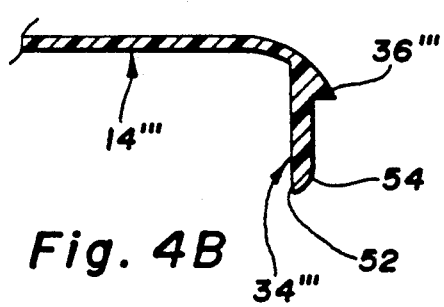
FIG. 4B is a view, partially broken away and in cross section, of a third embodiment of the upper half of the plastic shell.
Figure 4C:
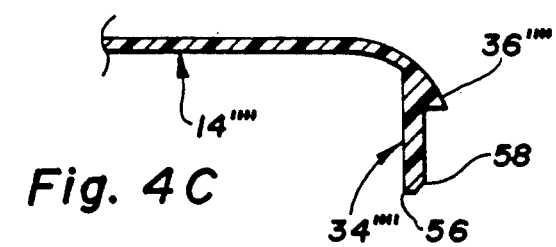
FIG. 4C is a view partially broken away and in cross section, of a fourth embodiment of an upper half of the plastic shell.

Referring now to FIGS. 3 through 4C, there are indicated different embodiments of the locking wall 34 wherein each different embodiment is given a different prime designation with the same reference numeral indicating the same or similar structure common to the different embodiments.

FIG. 3 illustrates a locking wall 34' of an upper shell half 14' having a knife edge 46 formed on a free end portion of the locking wall 34'.

FIG. 4A illustrates another embodiment of a locking wall 34" of a upper shell half 14" wherein the free end portion of the locking wall 34" has a pair of substantially right-angled inner and outer edges 48 and 50, respectively.

Referring now to FIG. 4B, a locking wall 34'" of upper shell half 14'" has an acutely-angled inner edge 52 and a rounded outer edge 54 formed on its free end portion.

Finally, referring now to FIG. 4C, a locking wall 34"" of upper shell half 14"" has a substantially right-angled inner edge 56 and a beveled outer edge 58 formed on a free end portion of the locking wall 34"".

While the best mode for carrying out the invention has been described in detail, those familiar with the art to which this invention relates will recognize various alternative designs and embodiments for practicing the invention as defined by the following claims.

What is claimed is:

1. In a sunVisor including an inner plastic shell having upper and lower halves and an outer fabric covering having free edge portions, an attachment mechanism for securing the covering on the shell so that the covering is prevented from working loose, the mechanism comprising:

elongated inner and outer walls integrally formed at an inner peripheral portion of the lower shell half to define a channel therebetween; and a mating locking wall integrally formed at an inner peripheral portion of the upper shell half, the locking wall extending into the channel to lock the free edge portions of the covering in the channel between the locking wall and the inner and outer walls when the shell is closed.

2. The sunvisor as claimed in claim 1 wherein the attachment mechanism further comprises an outer peripheral lip integrally formed with the locking wall and wherein the outer wall includes a free end portion, the free edge portions of the covering being secured between the lip and the free end portion of the outer wall when the shell is closed.

3. The sunvisor as claimed in claim 1 wherein the outer wall has a curved outer surface for receiving one free edge portion of the covering thereon and the lip has a curved outer surface for receiving another free edge portion of the covering thereon, the curved outer surfaces of the outer wall and the lip at least partially defining a curved outer surface of the shell when closed.

4. The sunvisor as claimed in claim 1 wherein the locking wall includes a free end portion having a pair of substantially right-angled inner and outer edges.

5. The sunvisor as claimed in claim 1 wherein the locking wall includes a free end portion having an acutely-angled inner edge and a rounded outer edge.

6. The sunvisor as claimed in claim 1 wherein the locking wall includes a free end portion having a substantially right-angled inner edge and a beveled outer edge.

7. The sunvisor as claimed in claim 1 wherein the locking wall includes a free end portion having a knife edge.

8. In a sunvisor including an inner plastic shell having upper and lower halves and an outer fabric covering having free edge portions, an attachment mechanism for securing the covering on the shell so that the covering is prevented from working loose, the mechanism comprising:

elongated inner and outer walls integrally formed at an inner peripheral portion of the lower shell half to define a channel therebetween wherein the outer wall includes a free end portion and a curved outer surface for receiving the second free end portion of the covering thereon;

a mating locking wall integrally formed at an inner peripheral portion of the upper shell half, the locking wall extending into the channel to lock the free edge portions of the covering in the channel between the locking wall and the inner and outer walls when the shell is closed; and an outer peripheral lip integrally formed with the locking wall, the lip having a curved outer surface for receiving one free edge portion of the covering thereon, the free edge portions of the covering being secured between the lip and the free end portion of the outer wall, the curved surfaces of the outer wall and the lip at least partially defining a curved outer surface when the shell is closed.

* * * * *